(12) United States Patent
Mizuta et al.

(10) Patent No.: US 11,818,437 B2
(45) Date of Patent: Nov. 14, 2023

(54) SYSTEM, METHOD, AND COMPUTER-READABLE MEDIUM INCLUDING PROGRAM FOR DISTRIBUTING LIVE VIDEO

(71) Applicant: DeNA Co., Ltd., Tokyo (JP)

(72) Inventors: Daisuke Mizuta, Tokyo (JP); Eri Matsuda, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 17/491,929

(22) Filed: Oct. 1, 2021

(65) Prior Publication Data
US 2022/0021939 A1 Jan. 20, 2022

Related U.S. Application Data

(63) Continuation of application No. PCT/JP2020/006440, filed on Feb. 19, 2020.

(30) Foreign Application Priority Data

Apr. 2, 2019 (JP) .................................. 2019-070403

(51) Int. Cl.
H04N 21/4784 (2011.01)
H04N 21/2187 (2011.01)
H04N 21/442 (2011.01)

(52) U.S. Cl.
CPC ..... *H04N 21/4784* (2013.01); *H04N 21/2187* (2013.01); *H04N 21/44204* (2013.01)

(58) Field of Classification Search
CPC ........... H04N 21/4784; H04N 21/2187; H04N 21/44204; H04N 21/41407;
(Continued)

(56) References Cited

U.S. PATENT DOCUMENTS

2015/0057944 A1* 2/2015 White .................. A61B 5/4866
702/19
2015/0296242 A1* 10/2015 Khalil ................ H04N 21/4784
725/43
(Continued)

FOREIGN PATENT DOCUMENTS

JP 2014-067275 A 4/2014
JP 2017-121021 A 7/2017
(Continued)

OTHER PUBLICATIONS

Office Action issued in counterpart Japanese Patent Application No. 2019-070403 dated Apr. 28, 2020 (11 pages).
(Continued)

*Primary Examiner* — Alazar Tilahun
(74) *Attorney, Agent, or Firm* — Osha Bergman Watanabe & Burton LLP

(57) ABSTRACT

A video distribution server according to one embodiment of the present invention allows a distributor or viewers to be involved in giving rewards to other viewers, while encouraging viewers to continue viewing a live video. The server provides a live video distribution service for distributing and viewing live videos to users via user terminals. The server gives a predetermined reward to a viewer whose viewing duration of a live video provided by a distributor reaches the predetermined threshold, and the predetermined reward is given based on the attribute or action of the distributor or viewers. This may allow a distributor and viewers to be involved in giving rewards to other viewers, while encouraging viewers to continue viewing a live video.

10 Claims, 18 Drawing Sheets

(58) Field of Classification Search
CPC ........... H04N 21/4143; H04N 21/2743; H04N 21/25866; H04N 21/4223; H04N 21/4756; H04N 21/44218; H04N 21/4424; G06F 13/00; G06Q 30/02; G06Q 50/10
See application file for complete search history.

(56) References Cited

U.S. PATENT DOCUMENTS

2016/0373499 A1* 12/2016 Wagner ................ H04N 21/436
2019/0268662 A1* 8/2019 Payzer ............. H04N 21/25891

FOREIGN PATENT DOCUMENTS

| JP | 2018-005320 A | 1/2018 |
| JP | 2019-022219 A | 2/2019 |
| WO | 2018/142494 A1 | 8/2018 |

OTHER PUBLICATIONS

International Search Report issued in corresponding International Patent Application No. PCT/JP2020/006440 dated May 19, 2020 (5 pages).
Written Opinion issued in corresponding International Patent Application No. PCT/JP2020/006440 dated May 19, 2020 (4 pages).
Office Action issued in corresponding Japanese Patent Application No. 2022-097986, dated Sep. 5, 2023, (12 pages).

* cited by examiner

USER INFORMATION TABLE 411

| USER ACCOUNT |
| --- |
| BASIC INFORMATION |
| DISTRIBUTION HISTORY INFORMATION |
| VIEWING HISTORY INFORMATION |
| VIEWING DURATION |
| NO COMMENT-INPUTTING DURATION |
| FOLLOWING USER INFORMATION |
| FOLLOWER INFORMATION |
| RANKING |
| RANKING METER VALUE |
| NUMBER OF HELD COINS |
| NUMBER OF HELD DIAMONDS |
| ... |

FIG. 3

| RANKING BAND | S | | | A | | | B | | | C | | | D | | | E |
|---|---|---|---|---|---|---|---|---|---|---|---|---|---|---|---|---|
| RANKING | S+ | S | S- | A+ | A | A- | B+ | B | B- | C+ | C | C- | D+ | D | D- | E |

FIG. 4

DISTRIBUTION MANAGEMENT TABLE 412

| DISTRIBUTION ID |
| --- |
| DISTRIBUTOR USER ACCOUNT |
| DISTRIBUTION DATE AND TIME |
| DISTRIBUTION DURATION |
| NUMBER OF VIEWERS (CURRENT VALUE AND MAXIMUM VALUE) |
| NUMBER OF COMMENTS |
| NUMBER OF LIKES |
| ITEM POINTS |
| DISTRIBUTION POINTS |
| ... |

FIG. 5

| TYPE of DISTRIBUTION \ RANKING BAND | S | A | B | C | D | E |
|---|---|---|---|---|---|---|
| REGULAR | \multicolumn{2}{c}{HYPER BOX} | | \multicolumn{2}{c}{SUPER BOX} | | \multicolumn{2}{c}{REGULAR BOX} | |
| RADIO | HYPER BOX | \multicolumn{2}{c}{SUPER BOX} | | \multicolumn{3}{c}{REGULAR BOX} | | |

FIG. 11

| RATING OF DISTRIBUTION POINTS WITHIN RANKING BAND ON PREVIOUS DAY | FLUCTUATION IN RANKING METER VALUE |
|---|---|
| TOP 10% | +2 |
| TOP 11 TO 30% (REMAINING 20% AFTER SUBTRACTING TOP 10% FROM TOP 30%) | +1 |
| MIDDLE 30% | ±0 |
| BOTTOM 40% | −1 |
| *NO DISTRIBUTION THAT DAY | −1 |

FIG. 15

| RANKING UPDATE DETAILS | NECESSARY RANKING METER VALUE |
|---|---|
| INCREASE IN RANKING TO ANOTHER RANKING BAND | +4 |
| INCREASE IN RANKING WITHIN SAME RANKING BAND | +2 |
| DECREASE IN RANKING WITHIN SAME RANKING BAND | −2 |
| DECREASE IN RANKING TO ANOTHER RANKING BAND | −6 |

FIG. 16

SYSTEM, METHOD, AND COMPUTER-READABLE MEDIUM INCLUDING PROGRAM FOR DISTRIBUTING LIVE VIDEO

CROSS-REFERENCE TO RELATED APPLICATIONS

The present application is a continuation of the international application No. PCT/JP2020/006440, filed on Feb. 19, 2020, the content of which is incorporated herein in its entirety by reference.

TECHNICAL FIELD

The present invention relates to a system, method, and computer-readable medium including a program for distributing live videos.

BACKGROUND ART

Conventional systems for providing live video distribution services have been proposed (see Japanese Patent Application Publication No. 2019-022219 for example). Such a live video distribution service may offer some rewards to their users (viewers) to encourage them to continue watching a live video. For example, some live video distribution services give specific rewards (such as virtual items that can be used in the live video distribution service) to viewers when their viewing duration of a live video reaches a predetermined threshold (e.g., 7 minutes). Such rewards based on a viewing duration may encourage viewers to continue watching a live video.

However, conventional rewards based on the viewing duration are given according to a rule made by an operator of the live video distribution service, and a distributor of a live video cannot be involved in determining how the rewards are given and what the rewards are. Also, some viewers may be interested in increasing the number of fans of the distributors that they specifically support and thus may want to be involved in or contribute giving the rewards described above. Accordingly, it is desired to achieve the mechanism that allows a distributor or viewers to be involved in giving such rewards.

One of the objects of the embodiments of the present invention is to allow a distributor or viewers to be involved in giving rewards to other viewers during distribution of a live video. Other objects of the embodiments of the present invention will be made apparent with reference to the entire description.

SUMMARY

A system according to one embodiment of the present invention includes one or more computer processors. The one or more computer processors execute machine-readable instructions to perform: distributing a live video provided by a distributor to a plurality of viewers; and giving a predetermined reward to a viewer included in the plurality of viewers during distribution of the live video. In the system, the giving of the predetermined reward includes giving, in response to a predetermined condition being satisfied, the predetermined reward based at least on a first attribute or action of the distributor and/or a second attribute or action of at least some of the plurality of viewers; and the predetermined condition includes at least a first necessary condition that a first duration during which the viewer remains viewing the live video reaches a first threshold.

A method according to one embodiment of the present invention is executed by one or more computers. The method includes: distributing a live video provided by a distributor to a plurality of viewers; and giving a predetermined reward to a viewer included in the plurality of viewers during distribution of the live video. In the method, the giving of the predetermined reward includes giving, in response to a predetermined condition being satisfied, the predetermined reward based at least on a first attribute or action of the distributor and/or a second attribute or action of at least some of the plurality of viewers; and the predetermined condition includes at least a first necessary condition that a first duration during which the viewer remains viewing the live video reaches a first threshold.

A non-transitory computer-readable medium according to one embodiment of the present invention includes a program. The program causes one or more computers to execute: distributing a live video provided by a distributor to a plurality of viewers; and giving a predetermined reward to a viewer included in the plurality of viewers during distribution of the live video. In the program, the giving of the predetermined reward includes giving, in response to a predetermined condition being satisfied, the predetermined reward based at least on a first attribute or action of the distributor and/or a second attribute or action of at least some of the plurality of viewers; and the predetermined condition includes at least a first necessary condition that a first duration during which the viewer remains viewing the live video reaches a first threshold.

Various embodiments of the present invention may allow a distributor or viewers to be involved in giving rewards to other viewers during the distribution of a live video.

BRIEF DESCRIPTION OF DRAWINGS

FIG. 3 illustrates information managed in a user information table 411.

FIG. 4 is a diagram illustrating rankings of distributors.

FIG. 5 illustrates information managed in a distribution management table 412.

FIG. 11 illustrates types of reward boxes corresponding to combinations of distribution types and ranking bands of distributors.

FIG. 15 is a diagram illustrating a rule for updating a ranking meter value.

FIG. 16 is a diagram illustrating correspondence relationship between ranking update details and necessary ranking meter values.

DETAILED DESCRIPTION

Embodiments of the present invention will be described below with reference to the drawings.

Figure 1:
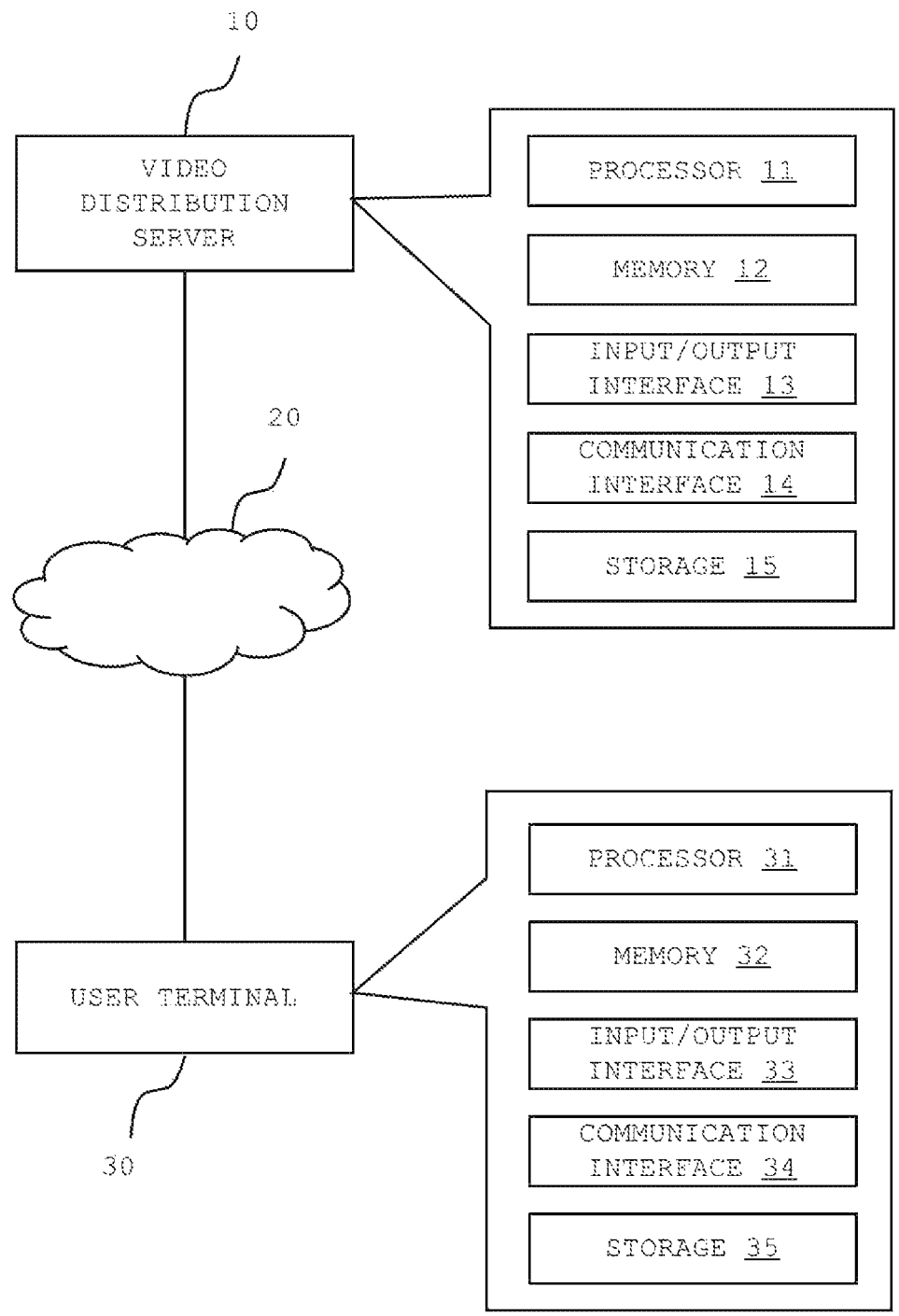
FIG. 1 is a configuration diagram schematically illustrating a configuration of a network including a video distribution server 10 according to an embodiment of the present invention.

FIG. 1 is a configuration diagram schematically illustrating a configuration of a network including a video distribution server 10 according to an embodiment of the present invention. As illustrated, the video distribution server 10 is communicably connected to a user terminal 30 via a communication network 20 such as the Internet. Only one user terminal 30 is illustrated in FIG. 1, but the server 10 is communicably connected to a plurality of user terminals 30. The video distribution server 10 provides a live video distribution (live streaming) service for distributing and viewing live videos to a user via the user terminal 30. In the present embodiment, the user that operates the user terminal 30 can distribute a live video as a distributor (streamer) and can also view live videos provided by other users as a viewer. The video distribution server 10 is an example of a device in which all or a part of the system of the present invention is achieved.

The video distribution server 10 is configured as a typical computer. As illustrated in FIG. 1, the video distribution server 10 includes a computer processor 11, a main memory 12, an input/output interface 13, a communication interface 14, and a storage 15. These components are electrically connected via a bus (not illustrated) or the like.

The computer processor 11 is configured as a CPU, a GPU, or the like, reads various kinds of programs that are stored in the storage 15 or the like into the main memory 12, and executes various kinds of commands (instructions) included in the programs.

The input/output interface 13 includes various kinds of input/output devices for transmitting and receiving information with a user or the like. The input/output interface 13 includes, for example, an information input device such as a keyboard and a pointing device (for example, a mouse, a touch panel, and the like), a sound input device such as a microphone, and an image input device such as a camera. The input/output interface 13 includes an image output device such as a display, and a sound output device such as a speaker.

The communication interface 14 is implemented as hardware such as a network adapter, various kinds of communication software, or combinations thereof, and is configured to achieve wired or wireless communication via the communication network 20 or the like.

The storage 15 is constituted with a magnetic disk, a flash memory, or the like. The storage 15 stores various kinds of programs including an operating system, various kinds of data, and the like.

In the present embodiment, the video distribution server 10 may be configured with a plurality of computers each having the hardware configuration described above. For example, the video distribution server 10 may be constituted with one or more server devices.

The video distribution server 10 configured in such a manner may function as a web server and an application server. In this case, the video distribution server 10 executes various kinds of processing in response to a request from a web browser and other applications (such as an application for the live video distribution service) installed on the user terminal 30, and transmits, to the user terminal 30, screen data (such as HTML data), control data, and the like according to a result of the processing. The user terminal 30 may display a web page or another screen based on the received data.

The user terminal 30 is configured as a typical computer. As illustrated in FIG. 1, the user terminal 30 includes a computer processor 31, a main memory 32, an input/output interface 33, a communication interface 34, and a storage 35. These components are electrically connected via a bus (not illustrated) or the like.

The computer processor 31 is configured as a CPU, a GPU, or the like, reads various kinds of programs that are stored in the storage 35 or the like into the main memory 32, and executes various kinds of commands (instructions) included in the programs. The main memory 32 is constituted with a DRAM or the like, for example.

The input/output interface 33 includes various kinds of input/output devices for transmitting and receiving information with a user or the like. The input/output interface 33 includes, for example, an information input device such as a keyboard and a pointing device (for example, a mouse, a touch panel, and the like), a sound input device such as a microphone, and an image input device such as a camera. The input/output interface 33 includes an image output device such as a display, and a sound output device such as a speaker.

The communication interface 34 is implemented as hardware such as a network adapter, various kinds of communication software, or combinations thereof, and is configured to achieve wired or wireless communication via the communication network 20 or the like.

The storage 35 is constituted with a magnetic disk, a flash memory, or the like. The storage 35 stores various kinds of programs including an operating system, various kinds of data, and the like. The programs stored in the storage 35 may be downloaded from an application market or the like and then installed.

In the present embodiment, the user terminal 30 may be configured as a smartphone, a tablet terminal, a wearable device, a personal computer, a game console, and the like.

The user that operates the user terminal 30 having the above configuration can use a live video distribution service provided by the video distribution server 10 by executing communication with the video distribution server 10 via a web browser or another application installed in the storage 35 or the like.

Figure 2:
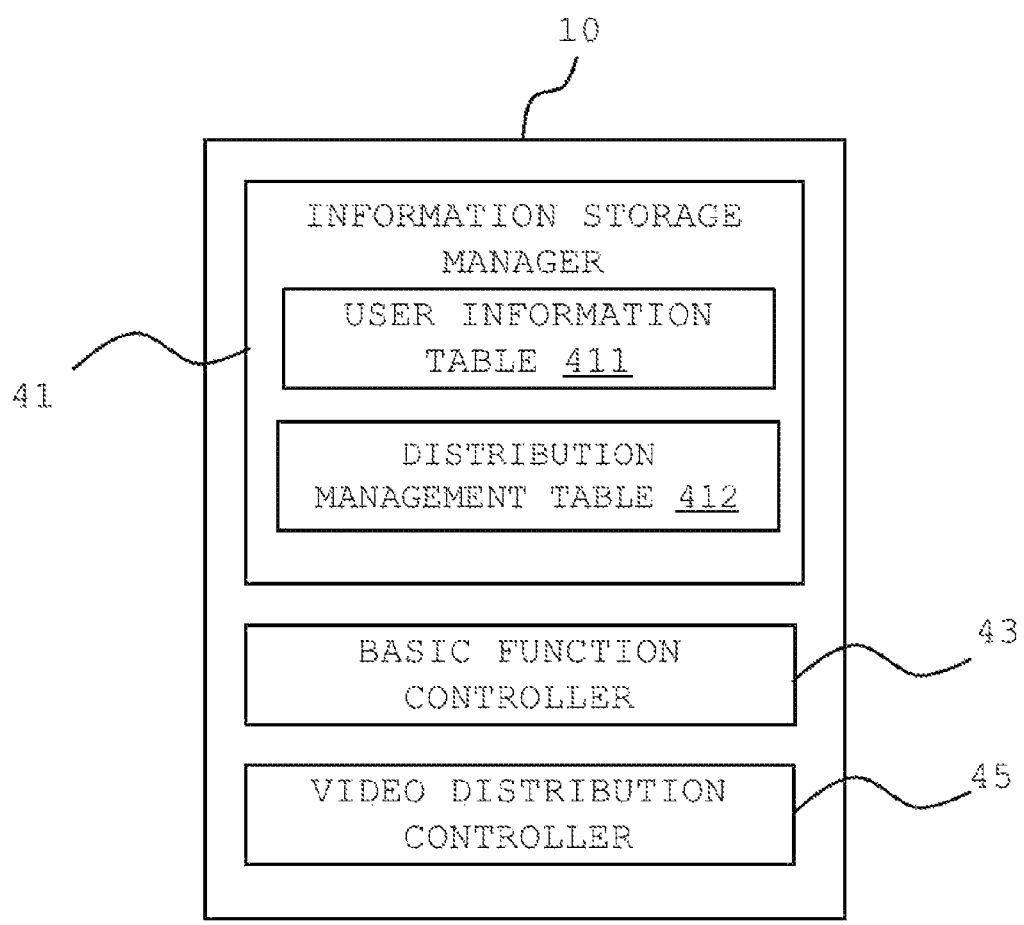
FIG. 2 is a block diagram schematically illustrating functions of the video distribution server 10.

Next, the functions of the video distribution server 10 according to the present embodiment will be described. FIG. 2 is a block diagram schematically illustrating the functions of the video distribution server 10. As illustrated, the server 10 includes an information storage manager 41 that stores and manages various information, a basic function controller 43 that controls basic functions of the live video distribution service, and a video distribution controller 45 that controls the distribution of live videos. These functions are achieved by the cooperative operation of hardware, such as the computer processor 11 and the main memory 12, and various programs and data stored in the storage 15 and the like. For example, the functions are achieved by the computer processor 11 executing commands included in a program loaded into the main memory 12. In addition, some or all the functions illustrated in FIG. 2 may be achieved by the cooperative operation of the server 10 and the user terminal 30 or can be achieved by the user terminal 30.

The information storage manager 41 of the video distribution server 10 stores and manages various kinds of information in the storage 15 and the like. For example, as illustrated in FIG. 2, the information storage manager 41 is configured to have a user information table 411 for managing information related to a user of the live video distribution service and a distribution management table 412 for managing information related to the distribution of an individual live video.

The basic function controller 43 of the video distribution server 10 executes various processing related to the control of basic functions of the live video distribution service. For example, the basic function controller 43 transmits data, such as screen data and control data, for various screens related to the basic functions to the user terminal 30, executes various processing in response to an operation inputted by the user via the screen displayed on the user terminal 30, and transmits data, such as the screen data and the control data, according to a result of the processing to the user terminal 30. The basic functions controlled by the basic function controller 43 include, for example, login processing (user authentication), fee charging control, and user management (such as the updating of the user information table 411).

The video distribution controller 45 of the video distribution server 10 executes various processing related to controlling the distribution of live videos. For example, the video distribution controller 45 is configured to distribute a live video provided by each of a plurality of distributors to a plurality of viewers. For example, the video distribution controller 45 is configured to receive a live video (stream) transmitted from the user terminal 30 of a distributor (hereinafter sometimes referred to as a "distributor terminal 30") and then transmit the live video to the user terminal 30 of each of the plurality of viewers (hereinafter sometimes referred to as a "viewer terminal 30"). The live video is formed of, for example, images inputted through a camera of the distributor terminal 30 and sound inputted through a microphone of the distributor terminal 30. Such a live video may be distributed by, for example, a streaming method using a protocol such as HTTP Live Streaming (HLS).

In the present embodiment, the video distribution controller 45 is configured to give predetermined rewards to viewers during distribution of a live video. For example, the video distribution controller 45 is configured to give the predetermined reward to a viewer watching a live video provided by a distributor in response to a predetermined condition being satisfied during the distribution of the live video. In the present embodiment, the predetermined condition for giving the predetermined reward includes at least the necessary condition that the viewing duration during which the viewer remains viewing the live video reaches a predetermined threshold (e.g., 30 seconds, 3 minutes, or 7 minutes, etc.).

The video distribution controller 45 is configured to give the predetermined reward to the viewer based at least on an attribute or action of the distributor and/or an attribute or action of at least some of the plurality of viewers watching the live video. The predetermined reward in the present embodiment includes various kinds of virtual or electronic rewards such as a virtual item (including a coin, a point, or the like) that can be used in the live video distribution service.

As described above, the video distribution server 10 in the present embodiment gives the predetermined reward to the viewer whose viewing duration of the live video reaches the predetermined threshold, and the predetermined reward is given based on the attribute or action of the distributor or other viewers. This may allow a distributor or viewers to be involved in giving rewards to other viewers, while encouraging the viewers to continue viewing a live video.

In the present embodiment, giving the predetermined reward based on the attribute or action of the distributor or viewers includes changing the manner of giving the reward or changing the reward itself, based on these attributes or actions. For example, the video distribution controller 45 may be configured to change the manner of giving the predetermined reward based at least on the attribute or action of the distributor and/or the attribute or action of the viewers. The change in the manner of giving the reward includes, for example, a change in the conditions for giving the reward (the predetermined condition described above). For example, the video distribution controller 45 may be configured to selectively set, based on the attribute or action of the distributor or viewers, a first value or a second value as the above predetermined threshold regarding the viewing duration for giving the predetermined reward.

In the present embodiment, the video distribution controller 45 may be configured to change the predetermined reward itself based at least on the attribute or action of the distributor and/or the attribute or action of the viewers. The change in the predetermined reward itself includes a change in its content (type, and/or quantity, for example). This configuration may allow the predetermined reward itself to be varied based on the attribute or action of the distributor or viewers.

The video distribution controller 45 may be configured to receive predetermined input information inputted by each of the plurality of viewers during the distribution of the live video. The inputted information may be, for example, presented to the distributor and other viewers. For example, the video distribution controller 45 may be configured to present the live video to the viewers via a viewer screen displayed on each viewer terminal 30 and display the predetermined input information, which has been inputted via the viewer screen by any viewer, on the viewer screen displayed on each viewer terminal 30 and on a distributor screen displayed on the distributor terminal 30. The predetermined input information may be superimposed on the live video. The predetermined input information includes, but is not limited to, a comment and/or an item for example.

The video distribution controller 45 may be configured to suspend the measurement (counting or increasing) of the viewing duration of a viewer while a no inputting duration during which the viewer remains not inputting predetermined input information is more than a predetermined threshold (e.g., 30 seconds or 2 minutes), during distribution of the live video. That is, the video distribution controller 45 may be configured to suspend the measurement of the viewing duration when the viewer has not inputted the predetermined input information for a predetermined period of time and then resume the measurement of the viewing duration when the viewer inputs the predetermined input information. This configuration may promote viewers' inputting the predetermined input information in addition to continuously viewing the live video.

The video distribution controller 45 may be configured to give the predetermined reward to a viewer in response to a predetermined input being conducted by the viewer within a predetermined period of time (e.g., 10 seconds, 20 seconds or 60 seconds) after the viewing duration of the viewer reaches the predetermined threshold. This configuration may enable the reward to be given upon the predetermined input conducted by a viewer, thus preventing the viewer whose viewing duration has reached the predetermined threshold without watching the live video (e.g., with leaving the viewer terminal 30 unattended) from obtaining the predetermined reward.

In the present embodiment, the attribute or action of a distributor or viewers may include various kinds of attributes or actions. For example, the attribute or action of the distributor includes the type of the live video provided by the distributor. For example, the video distribution controller 45 may be configured to give the predetermined reward such that the predetermined reward given when the live video includes the moving image of the distributor is more valuable than that given when the live video does not include the moving image of the distributor. For example, the video distribution controller 45 is configured to give the first reward when the live video being distributed is the first type of live video that is formed of a moving image of the distributor and audio, while to give the second reward, which is less valuable than the first reward, when the live video being distributed is the second type of live video that is formed of the audio only (or, formed of a predetermined image and audio). Such distribution of the live video without a moving image of the distributor is sometimes referred to as "radio distribution". This configuration may promote the distribution of live video including a moving image of the distributor.

The attribute or action of a distributor includes a predetermined attribute (e.g., a ranking, a level, or duration of distribution) whose value is configured to increase as the distributor distributes a live video. For example, the video distribution controller 45 may be configured to give the predetermined reward such that the predetermined reward is more valuable as the predetermined attribute's value of the distributor is greater (or less). This configuration may increase the value of the reward given during the distribution of a live video provided by an advanced distributor (or beginner), thus promoting the viewing of the live video provided by the advanced distributor (or beginner).

The attribute or action of viewers includes an input performance of predetermined input information (e.g., comments and/or items). For example, the video distribution controller 45 may be configured to give the predetermined reward based on the input performance of the predetermined input information inputted by at least some of the plurality of viewers. For example, the predetermined reward to be given is more valuable as the number of pieces of the predetermined input information inputted by some of the plurality of viewers increases. This configuration may achieve giving the reward based on the input performance of the predetermined input information inputted by viewers.

The video distribution controller 45 may be configured to give the predetermined reward such that the predetermined reward given when at least some of the plurality of viewers inputs a predetermined item is more valuable than that given when the predetermined item is not inputted. For example, the video distribution controller 45 may be configured to give the first reward to viewers while the predetermined item is not inputted by the viewers, and to give the second reward, which is more valuable than the first reward, to the viewers after any viewer inputs the predetermined item. This configuration may encourage viewers to input the predetermined item.

The attribute or action of viewers may include various kinds of attributes such as a ranking, a level, and duration of viewing. For example, the video distribution controller 45 may be configured to give the predetermined reward such that the predetermined reward is more valuable as an average value of a ranking, a level, or duration of viewing of all or some of the plurality of viewers is greater (or less).

Next, a specific example of the video distribution server 10 according to the present embodiment having such functions will be described. FIG. 3 illustrates information managed in the user information table 411 in this example. The user information table 411 manages information related to a user of the live video distribution service. As illustrated, the table 411 manages, in association with "user account" that identifies an individual user, information such as "basic information", which includes an account name, age, gender, and the like; "distribution history information", which is information related to the distribution history of live videos; "viewing history information", which is information related to the viewing history of live videos distributed by other users; "viewing duration", which is a duration during which the user remains viewing a live video being currently distributed by another user; "no comment-inputting duration", which is a duration during which the user remains not inputting any comments to the live video that the user is currently viewing; "following user information", which is information related to other users followed by the user; "follower information", which is information related to other users (followers) who are following the user; "ranking", which indicates a ranking of the user as a distributor; "ranking meter value", which is a parameter value for determining whether to increase or decrease the ranking; "number of held coins", which indicates how many virtual coins are held in the live video distribution service; "number of held diamonds", which indicates how many virtual diamonds are held in the live video distribution service.

FIG. 4 is a diagram illustrating rankings of distributors in this example. As illustrated, there are six ranking bands of "S", "A", "B", "C", "D", and "E", and each of the five ranking bands of "S", "A", "B", "C", and "D" has three rankings (for example, a ranking in which "+" is added to a letter indicating a ranking band, a ranking with just the letter, and a ranking in which "−" is added to the letter, such as "S+", "S", and "S−"). The ranking band of "E" has one ranking, "E". That is, there are 16 levels (3×5+1=16) of rankings in this example.

Furthermore, among the ranking bands, the "S" side is the highest and the "E" side is the lowest. Among the rankings in the same ranking band, the "+" side is the highest and the "−" side is the lowest. In this example, the ranking of a user is set to "D−" as the initial value.

FIG. 5 illustrates information managed in the distribution management table 412 in this example. The distribution management table 412 manages information related to the distribution of individual live videos. As illustrated, the distribution management table 412 manages, in association with "distribution ID" that identifies an individual distribution (live video), information such as "distributor user account", which identifies a distributor of the distribution; "distribution date and time"; "distribution duration", which indicates a continuous duration of the distribution; "number of viewers (current value and maximum value)"; "number of comments", which is the number of comments inputted by viewers; "number of likes", which is the number of "likes" inputted by viewers; "item points", which increase according to viewers' inputting items; "distribution points", which are points given for the distribution.

Figure 6:
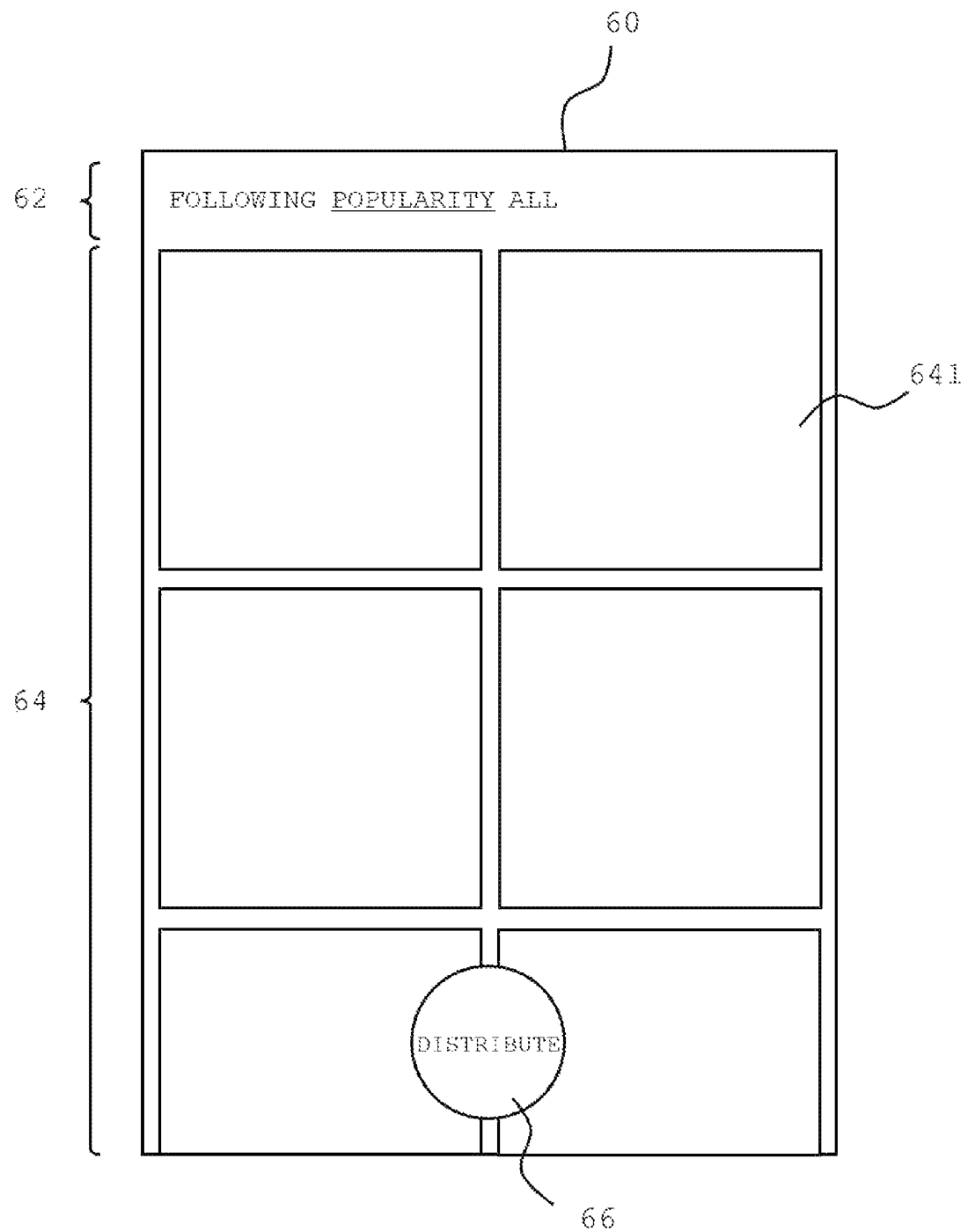
FIG. 6 illustrates a top screen 60.

FIG. 6 illustrates a top screen 60 of the live video distribution service. As illustrated, the screen 60 has a filter area 62 in which "FOLLOWING", "POPULARITY", and "ALL" are displayed, a list display area 64 displaying a list of live videos being distributed, and a distribution start button 66 labeled "DISTRIBUTE".

The filter area 62 is an area for setting filtering for the live videos displayed in the list display area 64. Specifically, when "FOLLOWING" is selected in the filter area 62, the live videos to be listed in the list display area 64 are narrowed down to the live videos of the other users followed by the user. Similarly, when "POPULARITY" is selected in the filter area 62, the live videos to be listed in the list display area 64 are narrowed down to the live videos extracted in accordance with a predetermined extraction condition for extracting popular videos. The predetermined extraction condition includes, for example, the condition that the number of viewers (current value) is more than or equal to a threshold value. When "ALL" is selected in the filter area 62, no filtering is set, and all live videos being distributed are targets to be listed in the list display area 64.

In the list display area 64, a plurality of individual display areas 641, each of which displays information related to an individual live video, are arranged in two columns. The individual display area 641 displays, for example, a still image preset by the distributor of the live video, the account name of the distributor, and the number of viewers (current value). The list display area 64 is configured such that a plurality of individual display areas 641 to be displayed are switched by a flicking or sliding operation (input) in the up and down direction.

The distribution start button 66 is an object that allows a user to start distributing a live video as a distributor. When a user selects the distribution start button 66, the distribution of the live video starts. Specifically, the video formed of an image inputted via the camera of the user terminal 30 and sound inputted via the microphone of the user terminal 30 starts to be transmitted to the server 10. In addition, a new record is created in the distribution management table 412 in response to the start of the live video distribution. The user can also select radio distribution in which the live video to be distributed does not include a moving image (i.e., an image inputted via the camera of the user terminal 30) when starting the live video distribution.

Figure 7:
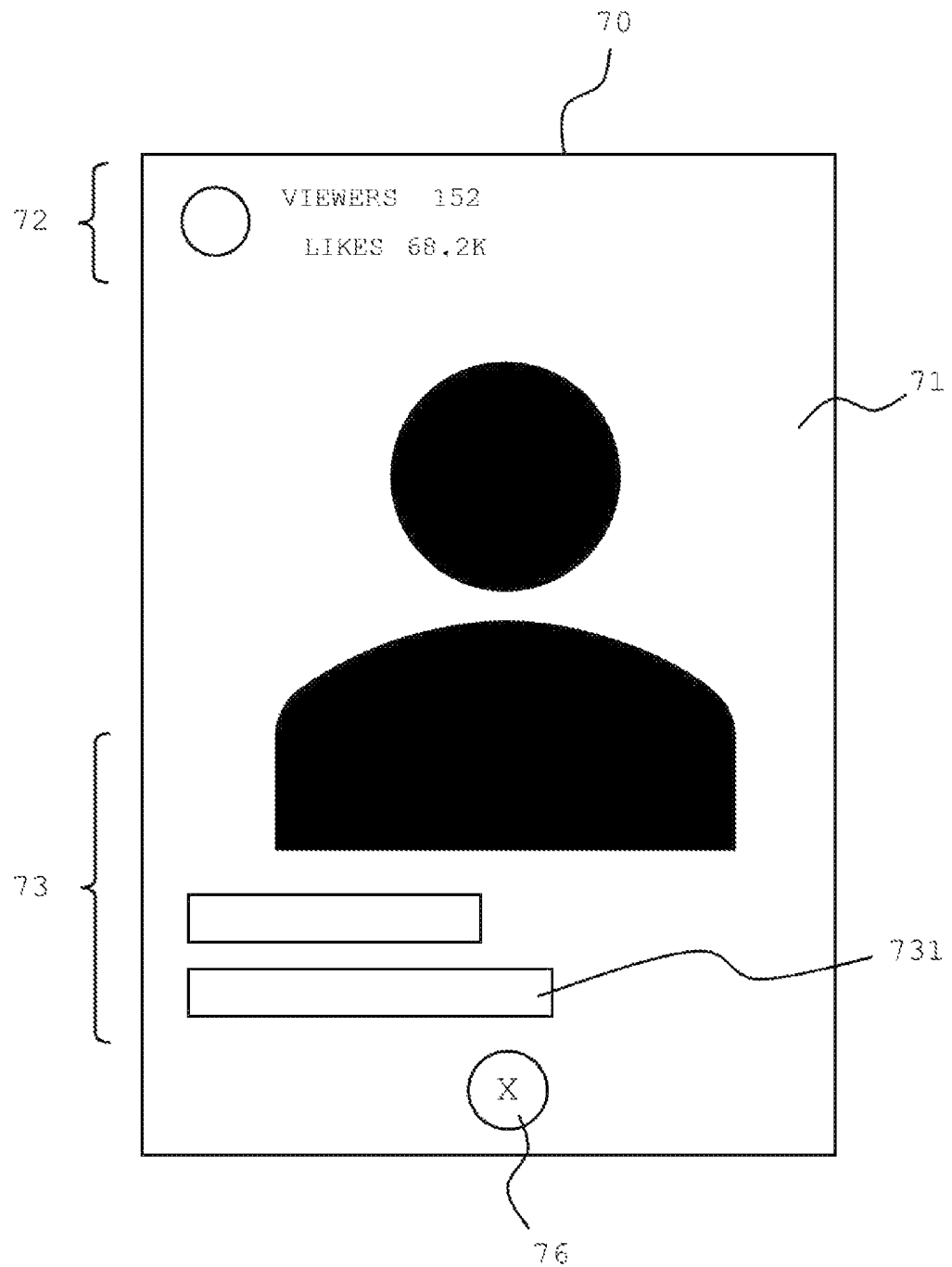
FIG. 7 illustrates a distributor screen 70.

FIG. 7 illustrates a distributor screen 70 displayed on the distributor terminal 30 in response to the selection of the distribution start button 66 (i.e., the start of the live video distribution). As illustrated, the screen 70 includes a video display area 71 corresponding to the entire screen, a basic information display area 72 located at the upper left corner of the screen, an action information display area 73 located at the lower left corner of the screen, and a circular distribution stop button 76 located at the center of the bottom edge of the screen.

The video display area 71 displays a live video to be distributed (i.e., an image inputted via the camera of the distributor terminal 30). The distributor usually makes himself/herself the subject of the video via the in-camera of the distributor terminal 30 and thus a moving image of the distributor himself/herself is included in the live video to be distributed. In the case of radio distribution, a predetermined image (still image or moving image) is displayed in the area 71.

The basic information display area 72 displays basic information of the distribution. The basic information of the distribution specifically includes distributor information (such as a profile image), the number of viewers (current value), and the number of "likes" inputted by viewers.

The action information display area 73 displays information related to actions performed by viewers. Specifically, a plurality of action objects 731 corresponding to individual actions are arranged in the up and down direction in the area 73. The action information display area 73 is configured such that, when any viewer performs a new action, the corresponding action object 731 is added to the bottom of the area 73 and the existing action objects 731 sequentially move upward. In addition, the action information display area 73 is configured such that the action objects 731 to be displayed are switched by a flicking or sliding operation (input) in the up and down direction. The actions of viewers displayed in the action information display area 73 include the entering of a distribution room (the starting of viewing a live video) and the inputting of a "like", a comment, or an item.

The distribution stop button 76 is an object that allows a distributor to stop the distribution of the live video. When a distributor selects the distribution stop button 76, the distribution of the live video (transmission of the live video from the distributor terminal 30 to the server 10) is stopped.

Figure 8:
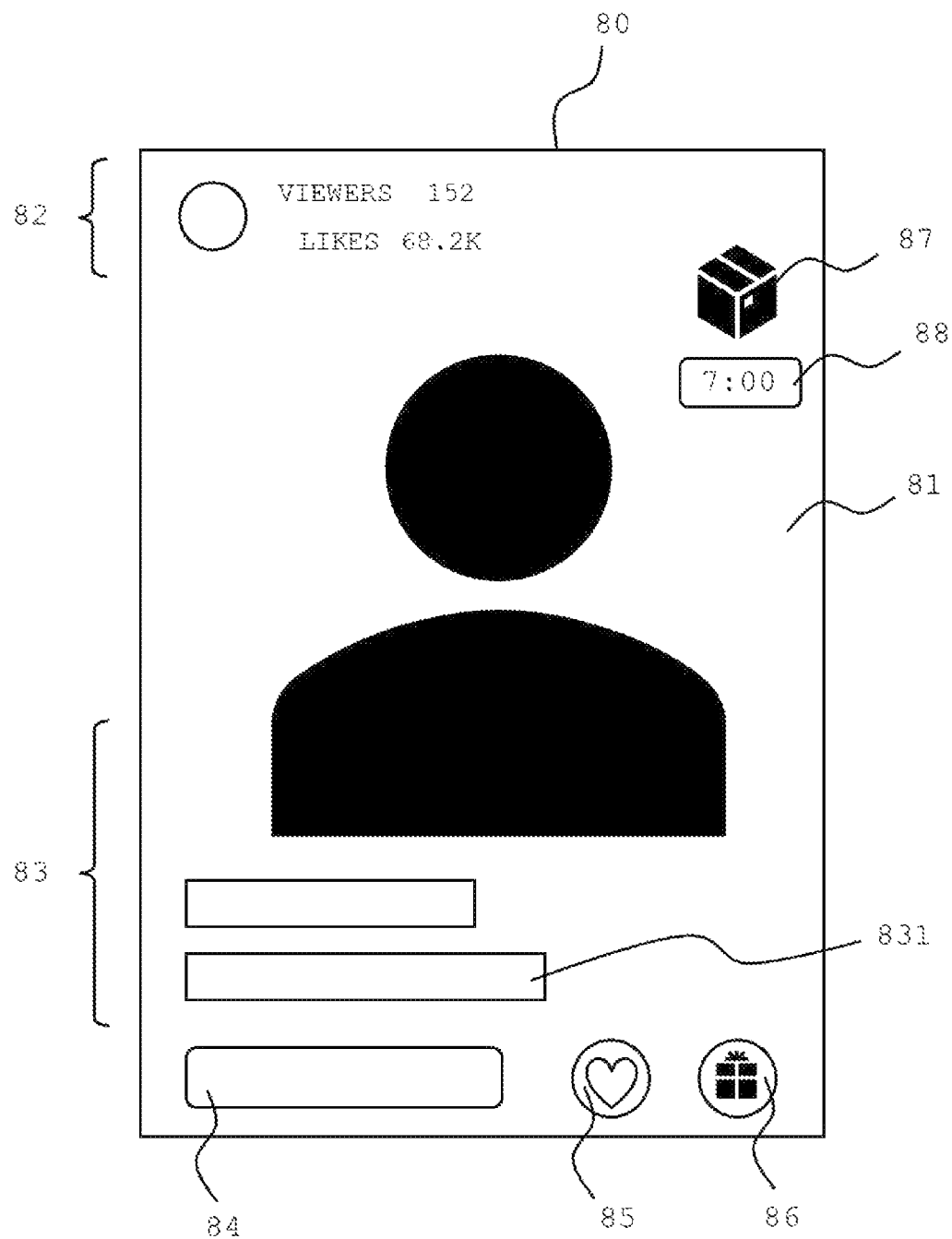
FIG. 8 illustrates a viewer screen 80.

FIG. 8 illustrates a viewer screen 80 displayed on the viewer terminal 30. For example, when a viewer selects any live video in the list display area 64 of the top screen 60, the viewer screen 80 for viewing the selected live video is displayed on the viewer terminal 30. As illustrated, the screen 80 has a video display area 81, a basic information display area 82, and an action information display area 83, which are like the distributer screen 70 described above. In addition, the viewer screen 80 has, at the bottom edge of the screen, a comment input area 84, a "like" button 85 with a heart mark displayed, and an item input button 86 with a symbol of a gift displayed. Furthermore, the viewer screen 80 has, at the upper right corner of the screen, a box object 87 having the appearance of a box and a remaining time display area 88 that indicates, like a countdown timer, the remaining time to the reward box being ready to open.

The comment input area 84 is an area that allows a viewer to input a comment. When a viewer inputs a comment via the area 84, the action objects 731 and 831 corresponding to the inputted comment are respectively added to the action information display area 73 of the distributor screen 70 displayed on the distributor terminal 30 and the action information display area 83 of the viewer screen 80 displayed on each viewer terminal 30. The action objects 731 and 831 corresponding to the comment display the account name of the viewer that has inputted the comment together with the comment body (text). In addition, when a comment is inputted, the number of comments in the distribution management table 412 is updated (increased by one).

The "like" button 85 is an object that allows a viewer to input a "like" for a distributor. When a viewer selects the button 85, a "like" is inputted and the action objects 731 and 831 corresponding to the "like" are respectively added to the action information display areas 73 and 83. The action objects 731 and 831 corresponding to the "like" display the account name of the viewer that has inputted the "like" together with the text indicating the input of a "like". In addition, when a "like" is inputted, a predetermined visual effect (such as an animation effect in which heart-shaped objects are displayed as flowing from the bottom to the top of the screen) is added in the video display areas 71 and 81. Furthermore, when a "like" is inputted, the number of "likes" in the distribution management table 412 is updated (increased by one).

Figure 9:
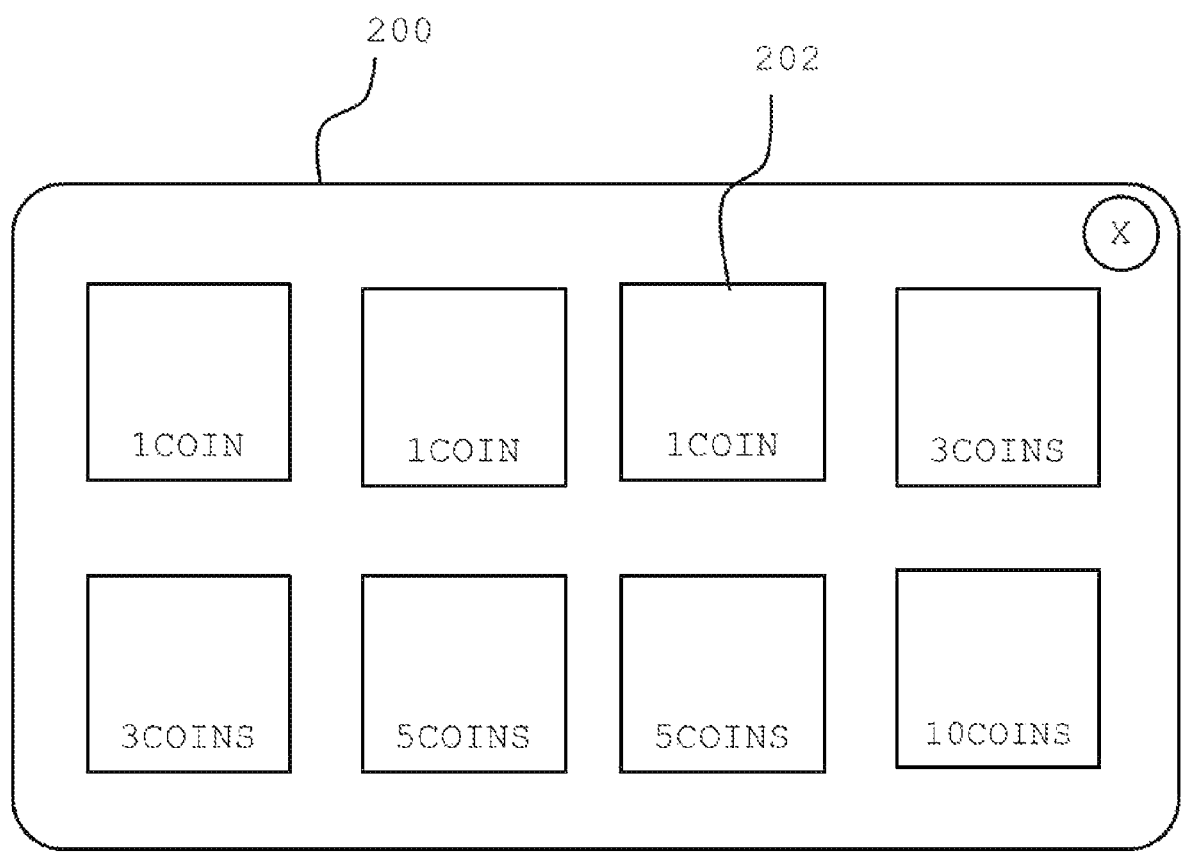
FIG. 9 illustrates an item selection screen 200.

The item input button 86 is an object that allows a viewer to input an item. When a viewer selects the button 86, an item selection screen 200 illustrated in FIG. 9 is displayed over the viewer screen 80. As illustrated, the screen 200 displays a list of individual display areas 202 each displaying information related to an item. The individual display area 202 displays an image corresponding to the item and the number of coins required to input the item.

In this example, a plurality of items that can be inputted by viewers are predetermined, and each of the plurality of items has the number of coins as a price (value). The item selection screen 200 displays a list of the plurality of items that can be inputted. When a viewer selects any of the items via the item selection screen 200, the selected item is inputted.

When an item is inputted, the action objects 731 and 831 corresponding to the inputted item are respectively added to the action information display areas 73 and 83. The action objects 731 and 831 corresponding to the item display the account name of the viewer that has inputted the item together with the name of the inputted item. In addition, when an item is inputted, a predetermined visual effect corresponding to the inputted item is added in the video display areas 71 and 81. Furthermore, when an item is inputted, the number of item points based on the number of coins required to input the item are given to this distribution and are added to the item points for the corresponding distribution in the distribution management table 412. The number of item points to be given increases as the number of coins required to input the item increases, for example. In addition, when an item is inputted, the number of coins corresponding to the inputted item is subtracted from the number of held coins for the corresponding user (viewer that has inputted the item) in the user information table 411.

Figure 10:
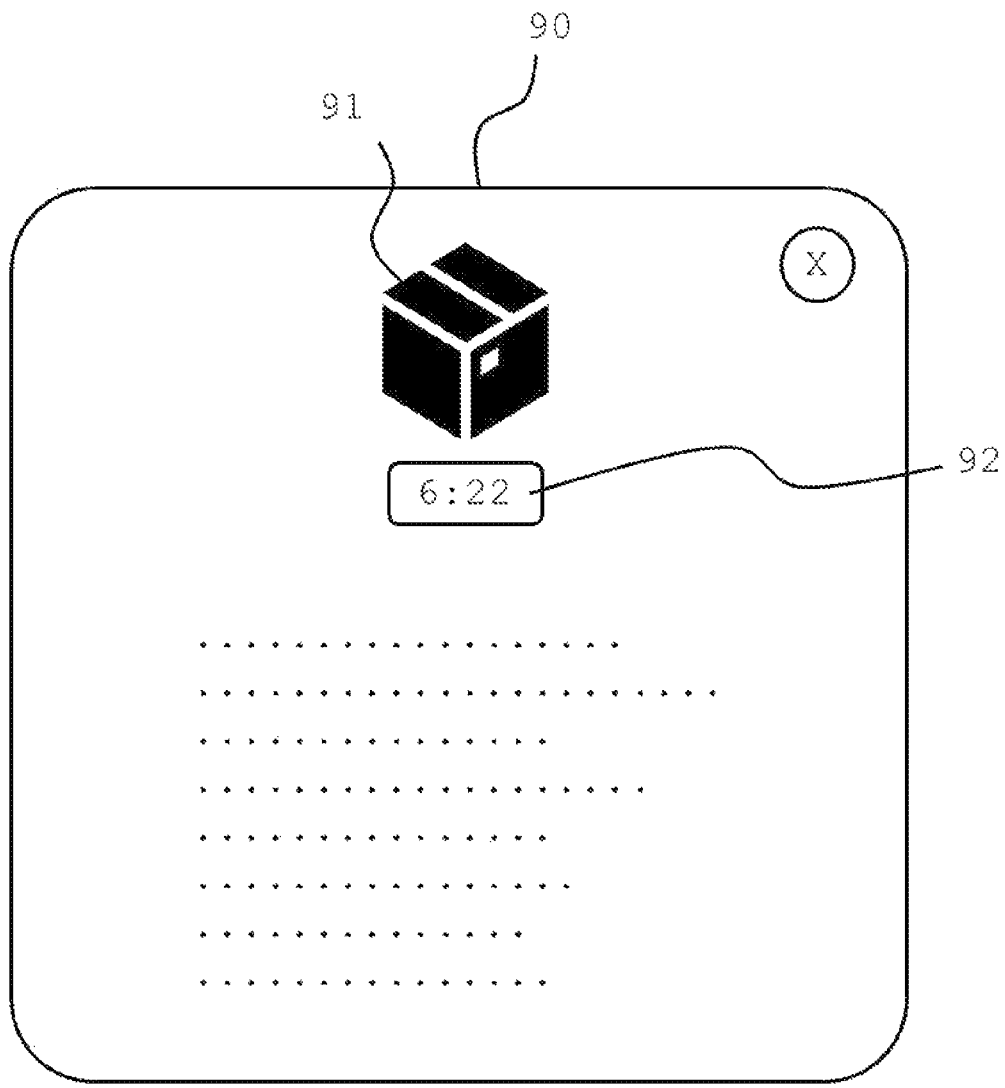
FIG. 10 illustrates a box detail information display screen 90.

FIG. 10 illustrates a box detail information display screen 90 displayed over the viewer screen 80 in response to the selection of the box object 87. The screen 90 displays information related to the reward box that the corresponding viewer can obtain. As illustrated, the screen 90 includes a box object 91 having the appearance of a box and a remaining time display area 92 indicating like a countdown timer the remaining time to the reward box being ready to open. Under the remaining time display area 92, a description of the reward box's specification is displayed.

In this example, three types of reward boxes to be given to viewers include a "regular box", a "super box", and a "hyper box". In addition, the reward box contains a predetermined number of coins. Specifically, the regular box contains 2-10 coins, the super box contains 20-30 coins, and the hyper box contains 50-100 coins. Thus, the super box is more valuable to viewers than the regular box, and the hyper box is more valuable to viewers than the super box.

In this example, the type of reward box to be given to a viewer is determined based on the distribution type of the live video that the viewer is watching and the ranking band (a predetermined attribute) of the distributor that is providing the live video. FIG. 11 illustrates the types of reward boxes corresponding to the combinations of the distribution types and the ranking bands of distributors. As illustrated, in the case of the distribution type of "regular distribution", which includes a moving image of a distributor, the hyper box corresponds to the distributor's rank bands of "S" and "A", the super box corresponds to the distributor's rank bands of "B" and "C", and the regular box corresponds to the distributor's rank bands of "D" and "E". On the other hand, in the case of the distribution type of "radio distribution", which does not include a moving image of a distributor (i.e., includes sound and a predetermined image), the hyper box corresponds to the distributor's rank band of "S", the super box corresponds to the distributor's rank bands of "A" and "B", and the regular box corresponds to the distributor's rank bands of "C", "D" and "E". Thus, the reward box given when the distribution type is "regular distribution" is more valuable to viewers than the reward box given when the distribution type is "radio distribution". Also, the reward box to be given is more valuable as the ranking band of a distributor is higher. In another example of the present embodiment, the reward box to be given may be configured to be more valuable as the ranking band of a distributor is lower. The box object 87 of the viewer screen 80 and the box object 91 of the box detail information display screen 90 are configured to have an appearance corresponding to the type of reward box determined according to the rule indicated in FIG. 11 (i.e., the type of the reward box that the viewer can obtain).

Figure 12:
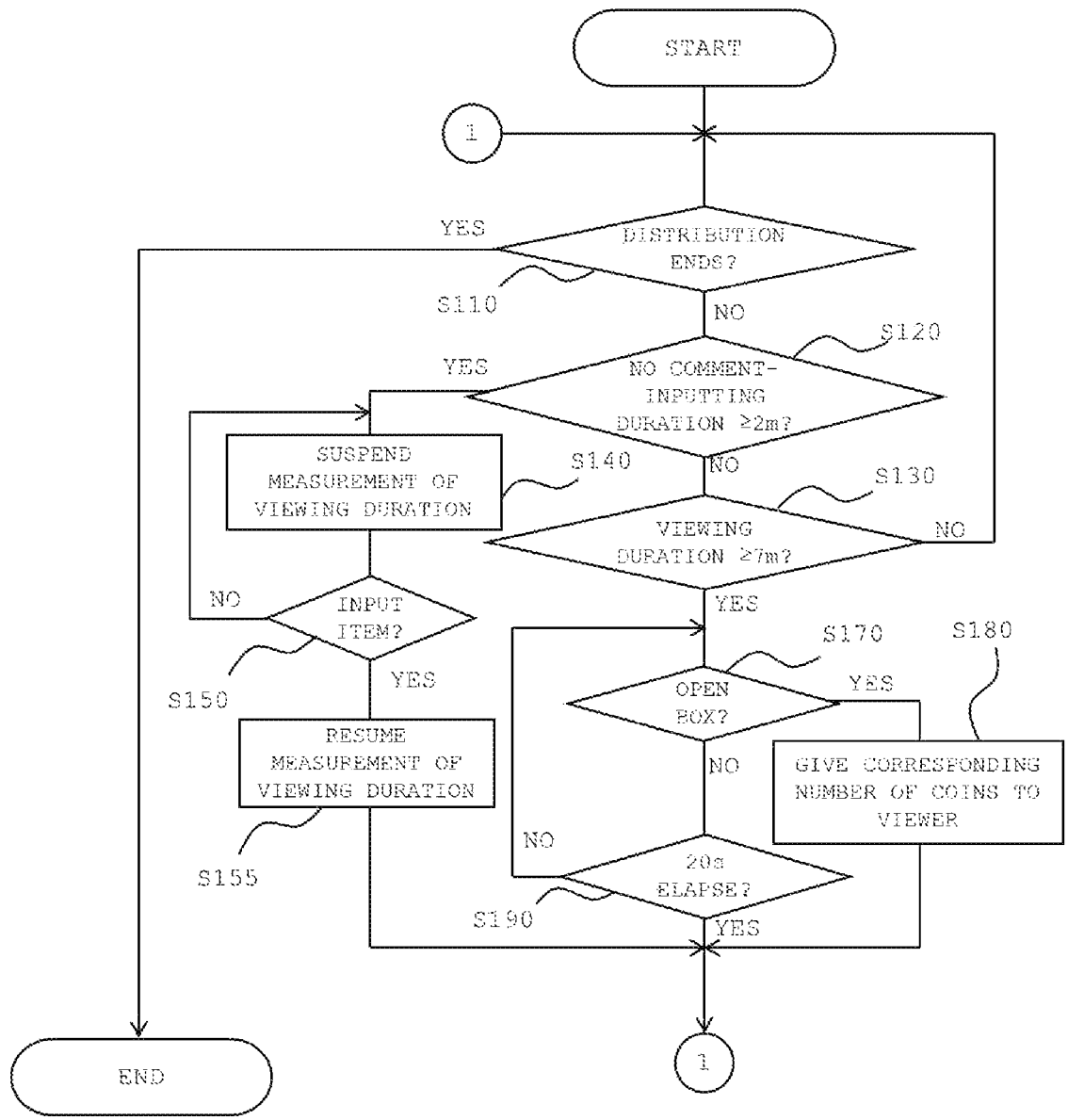
FIG. 12 is a flowchart illustrating a process executed by the server 10 when a user (viewer) starts watching a live video.

Next, the process related to opening a reward box will be described. FIG. 12 is a flowchart illustrating the process executed by the server 10 when a user (viewer) starts viewing a live video (i.e., when the viewer screen 80 is displayed). The process illustrated in FIG. 12 is executed separately for each viewer.

As illustrated, the server 10 waits for the no comment-inputting duration, which is a duration of the viewer's not inputting any comments to the live video, to reach 2 minutes, or for the viewing duration, which is a duration of the viewer's watching the live video, to reach 7 minutes (NO in step S120 and NO in step S130). This wait continues until the distribution of the live video ends (NO in step S110). During this wait, the remaining time to the reward box being ready to open is counted down in the remaining time display area 88 of the viewer screen 80 (and in the remaining time display area 92 of the box detail information display screen 90) according to an increase of the viewing duration. The no comment-inputting duration and the viewing duration are managed in the user information table 411 as described above.

When the no comment-inputting duration reaches 2 minutes before the viewing duration reaches 7 minutes (YES in step S120), the server 10 suspends the measurement of the viewing duration (i.e., suspends the countdown of the remaining time to the reward box being ready to open) (step S140). This suspension continues until the corresponding viewer inputs a comment (NO in step S150). While the measurement of the viewing duration is suspended, the box detail information display screen 90 prompts the viewer to input a comment. Then, when the corresponding viewer inputs a comment (YES in step S150), the server 10 resumes measuring the viewing duration (step S155) and returns to step S110.

When the viewing duration reaches 7 minutes (YES in step S130), the server 10 waits for the reward box to be opened until 20 seconds elapse (NO in step S170 and NO in step S190).

Figure 13:
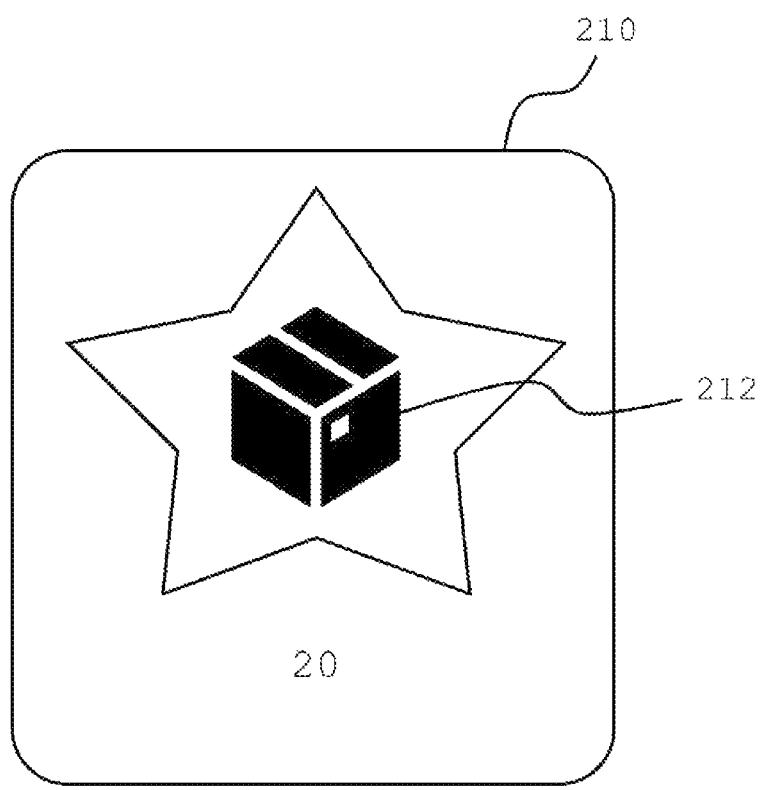
FIG. 13 illustrates a box opening screen 210.

FIG. 13 illustrates a box opening screen 210 that is displayed over the viewer screen 80 in response to the viewing duration reaching 7 minutes. At the center of the screen 210, a box object 212 for opening the reward box to obtain the reward is located. As illustrated, the time limit for opening the reward box (20 seconds) is displayed like a countdown timer under the object 212. The viewer can open the reward box by selecting the box object 212 within the time limit. Thus, setting the time limit for selecting the object 212 (i.e., for opening the reward box) may encourage viewers to watch the live video, compared to the case without setting such a time limit.

When the reward box is opened in response to the box object 212 of the box opening screen 210 being selected (YES in step S170), the server 10 gives the viewer the number of coins corresponding to the type of the opened reward box (step S180). Specifically, 2-10 coins are given when the regular box is opened, 20-30 coins are given when the super box is opened, and 50-100 coins are given when the hyper box is opened. The specific number of coins to be given is determined according to a predetermined rule (e.g., randomly) to be within the corresponding range of the number of coins. When the coins are given to the viewer, the number of held coins of the corresponding user (viewer) in the user information table 411 is updated.

When the reward box is opened (YES in step S170) or the time limit of 20 seconds elapses without the reward box being opened (YES in step S190), the server 10 returns to step S110. That is, in this example, viewers can repeatedly open the reward boxes while the live video is distributed. In another example of the present embodiment, the number of reward boxes that can be opened in a day by one viewer for one distributor may be limited to a predetermined number (e.g., two boxes).

The process related to opening the reward box has been described. Next, the process when the distributor ends his/her distribution will be described. As described above, when the distributor selects the distribution stop button 76 on the distributor screen 70, the distribution of the live video ends. When the distribution of the live video ends, the server 10 sets the distribution points for the distribution. In this example, the distribution points are calculated based on the number of viewers (maximum value), the number of "likes", the number of comments, and the item points. The distribution points are configured to increase as the number of viewers (maximum value), the number of likes, the number of comments, and the item points increase. The calculated distribution points are set in the distribution management table 412.

Figure 14:
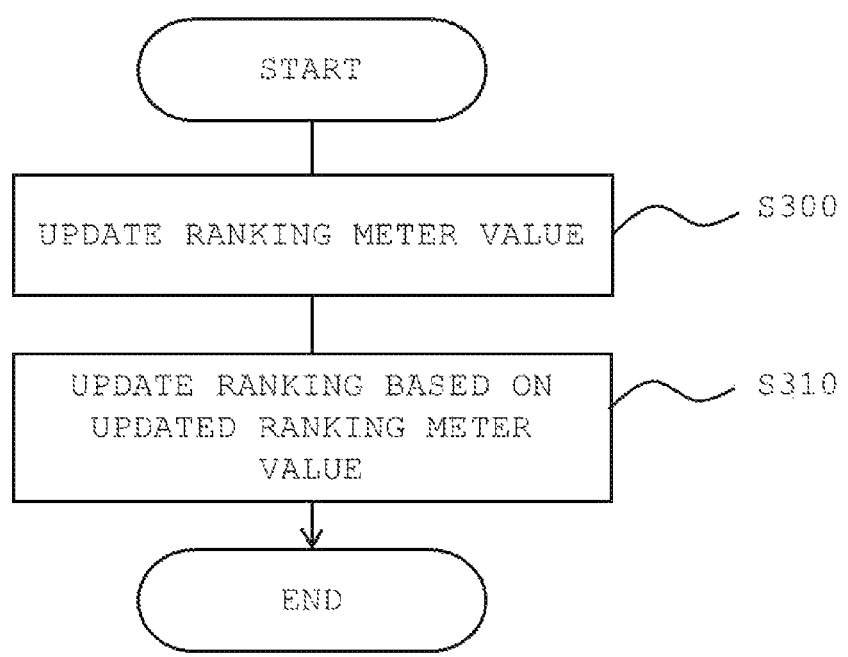
FIG. 14 is a flowchart illustrating a process executed by the server 10 for updating a ranking of each user.

In this example, a ranking on the day is determined (updated) based on the distribution points acquired by a user on the previous day. FIG. 14 is a flowchart illustrating the process executed by the server 10 for updating a ranking of each user. The process is executed in the middle of every night (for example, daily at 3 o'clock).

As illustrated, the server 10 updates a ranking meter value of each user (step S300). FIG. 15 is a diagram illustrating a rule for updating the ranking meter value. As illustrated, in this example, the ranking meter value fluctuates based on a rating of distribution points acquired by a user on the previous day within a ranking band to which the user belongs. The distribution points acquired by a specific user on the previous day is calculated by referring to the distributor user account, the distribution date and time, and the distribution points in the distribution management table 412. When the user performs several distributions on the same day, the distribution points acquired in these distributions are added together.

Specifically, as illustrated in FIG. 15, when a rating of the distribution points within the ranking band is included in the top 10%, the fluctuation in ranking meter value is "+2" (the increase of two points) in the rule for updating a ranking meter value. Similarly, the fluctuation when the rating is included in the top 11 to 30% (remaining 20% after subtracting the top 10% from the top 30%) is "+1", the fluctuation when the rating is included in the middle 30% (top 31 to 60%) is "±0" (no increase or decrease), and the fluctuation when the rating is included in the bottom 40% is "−1" (the decrease of one point). When no distribution is performed on the previous day, the fluctuation in ranking meter value is "−1" regardless of the rating within the ranking band.

In step S300, the ranking meter value of each user is updated in accordance with the update rule illustrated in FIG. 15. When a user has the ranking meter value that is negative and the fluctuation in ranking meter value this time is the increase (specifically, +2 or +1), the ranking meter value may be cleared to zero and then increased from there. For example, when a user's current value of the ranking meter value is "−1" and the fluctuation this time of the user is "+2", the ranking meter value is cleared to zero and then increased by two. Thus, the ranking meter value after the fluctuation is "+2" (not "+1"). In this way, even when a user has the ranking meter value that is negative (for example, a user with a low distribution frequency), the ranking meter value can be increased all at once, which may promote the distribution of live videos.

After updating the ranking meter value for each user, the server 10 updates the ranking based on the updated ranking meter value (Step S310). FIG. 16 is a diagram illustrating a correspondence relationship between the ranking update details and the necessary ranking meter values. As illustrated, the ranking meter value needed for a user to move up in ranking to another ranking band (that is, to move up in ranking from the highest ranking in each ranking band) is +4. In other words, a user belonging to the highest ranking (for example, A+) in each ranking band moves up in ranking to the lowest ranking (for example, S−) in a one level higher ranking band when the ranking meter value reaches +4. Further, the ranking meter value needed for a user to move up in ranking within the same ranking band (that is, to move up in ranking from the middle or lowest ranking in each ranking band) is +2. In other words, a user belonging to the middle or lowest ranking (for example, B or B−) in each ranking band moves up in ranking to a one level higher ranking (for example, B+ or B) within the same ranking band when the ranking meter value reaches +2.

Similarly, as illustrated in FIG. 16, the ranking meter value needed for a user to move down in ranking within the same ranking band (that is, to move down in ranking from the highest or middle ranking within each ranking band) is −2. In other words, a user belonging to the highest or middle ranking (for example, B+ or B) in each ranking band moves down in ranking to a one level lower ranking (for example, B or B−) within the same ranking band when the ranking meter value reaches −2. Further, the ranking meter value needed for a user to move down in ranking to another ranking band is −6. In other words, a user belonging to the lowest ranking (for example, A−) in each ranking band moves down in ranking to the highest ranking (for example, B+) within a one level lower ranking band when the ranking meter value reaches −6. In this way, the absolute value of the necessary ranking meter value for moving up or down in ranking to another ranking band is larger than that for moving up or down in ranking within the same ranking band, in this example. This can reduce moving up or down abruptly in ranking within a short period.

In step S310, the ranking is updated based on the ranking meter value in accordance with the correspondence relationship illustrated in FIG. 16. The ranking meter value of a user whose ranking has been updated (the user whose ranking has increased or decreased) is cleared to zero.

Figure 17:
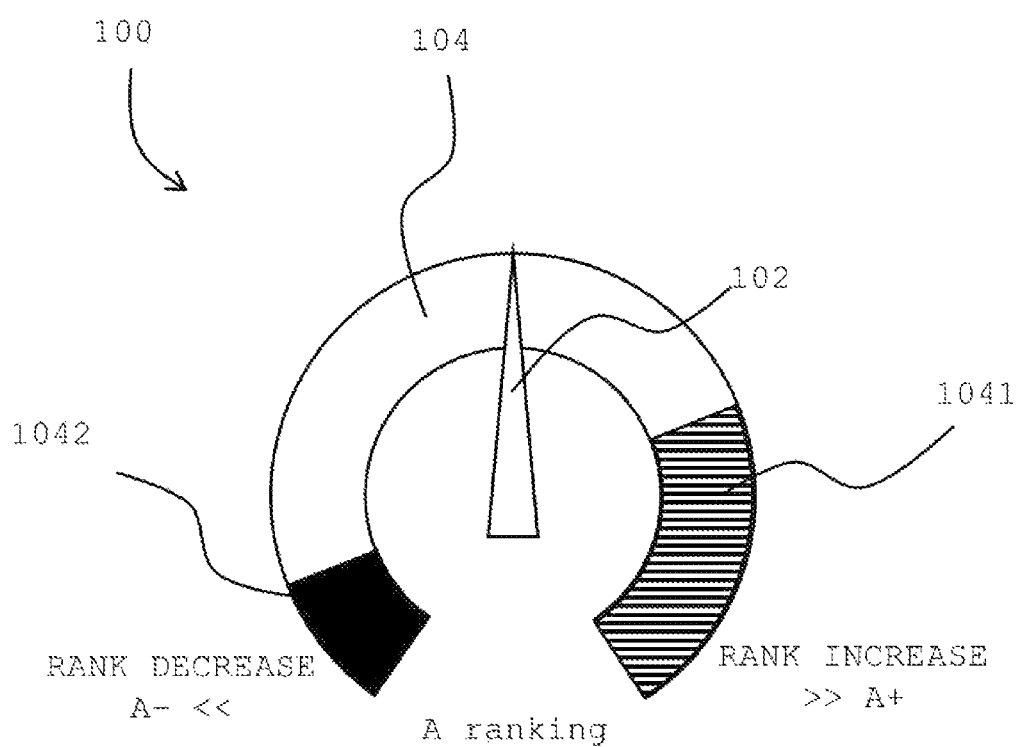
FIG. 17 illustrates a ranking meter object 100.

FIG. 17 illustrates a ranking meter object 100 displaying the ranking meter value of a user. The object 100 is located, for example, on a profile screen that displays the basic information related to a user. As illustrated, the ranking meter object 100 has a needle object 102 having a needle shape, and a scale object 104 having a "C" shape that opens downward. The current ranking of the user ("A ranking" in the FIG. 17) is displayed below the needle object 102. The needle object 102 is configured to swing (rotate) to the right as the ranking meter value increases, and to swing to the left as the ranking meter value decreases. The needle object 102 in FIG. 17 is in an upright position (pointing in the direction of 12 o'clock), which corresponds to the ranking meter value of zero. The needle object 102 inclines to the right as the ranking meter value increases in the positive direction, and to the left as the ranking meter value decreases in the negative direction. The scale object 104 has a rank-increase area 1041 corresponding to the ranking meter value needed for an increase in ranking on the lower right part of the object 104 and has a rank-decrease area 1042 corresponding to the ranking meter value needed for a decrease in ranking on the lower left part of the object 104. The ranking meter object 100 may allow a user to know the status of the ranking meter value that is headed toward a higher or lower ranking.

Figure 18:
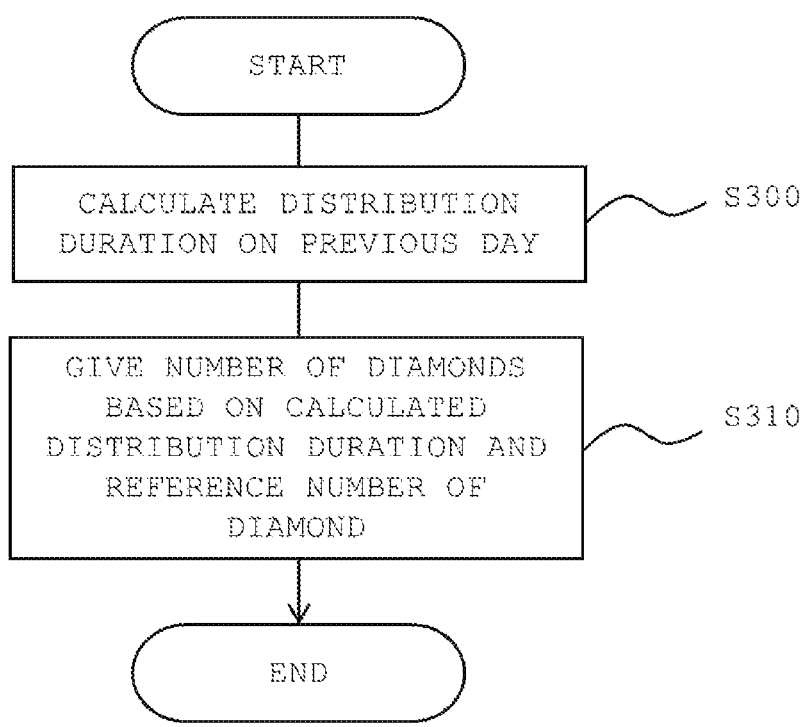
FIG. 18 is a flowchart illustrating a process executed by the server 10 for giving a diamond to each distributor.

In this example, the virtual diamond as a reward is given to a user as a distributor based on the distribution duration and the ranking on the previous day. FIG. 18 is a flowchart illustrating the process executed by the server 10 for giving a diamond to each distributor. This process is executed in the middle of every night, and is, for example, executed at a certain time before the process executed for updating the ranking of each user (for example, daily at 0 o'clock), which is illustrated in FIG. 14.

As illustrated, the server 10 calculates the distribution duration on the previous day of each user (step S400). Specifically, the distribution duration on the previous day of a specific user is specified by referring to the distributor user account, the distribution date and time, and the distribution duration in the distribution management table 412. When a user performs several distributions on the same day, the distribution durations of these distributions are added together.

The server 10 then gives diamonds to each user based on the calculated distribution duration and the reference number of diamonds (step S410). Specifically, the number of diamonds to be given to each user is obtained by multiplying the calculated distribution duration by the reference number of diamonds. The reference number of diamonds is preset for each ranking to increase with a higher ranking, and the reference number of diamonds corresponding to the ranking on the previous day of each user is applied. When the diamonds are given to the user, the number of held diamonds in the user information table 411 is updated. In this example, the diamonds can be exchanged for the coins or real currency.

In the example described above, the type of reward box to be given to the viewer whose viewing duration reaches a predetermined threshold (i.e., 7 minutes) is determined based on a combination of the distribution type of live video and the ranking band of a distributor. However, in another example of the present embodiment, instead of or in addition to this, the type of reward box to be given may change when a predetermined item is inputted by any viewer. For example, the regular box may be given to viewers before the predetermined item is inputted, while the super box (or the hyper box) may be given to a viewer whose viewing duration reaches the predetermined threshold after the predetermined item is inputted by any viewer.

In the example described above, a predetermined event may occur in response to a reward box being opened. Such a predetermined event may include, for example, the appearance of a boss character. Such a boss character may be displayed in the video display area 71 of the distributor screen 70 and in the video display area 81 of the viewer screen 80. Also, the boss character may be attacked in response to a certain item being inputted by a viewer. In this example, the predetermined event is not limited to this, and various kinds of events may occur in response to the reward box opening.

The video distribution server 10 according to the present embodiment described above gives the predetermined reward such as a reward box (i.e., the predetermined number of coins) to the viewer whose viewing duration of a live video provided by a distributor reaches the predetermined threshold, and the predetermined reward is given based on the attribute or action of the distributor or viewers (e.g., the distribution type, the ranking band of the distributor, and the viewer's input of an item). This may allow a distributor or viewers to be involved in giving rewards to other viewers, while encouraging viewers to continue viewing a live video.

The processing and procedures described in the specification may be achieved by software, hardware, or any combination of these in addition to what was explicitly described. For example, the processing and procedures described in the specification may be achieved by implementing a logic corresponding to the processing and procedures in a medium such as an integrated circuit, a volatile memory, a non-volatile memory, and a magnetic disk. Further, the processing and procedures described in the specification can be implemented as a computer program corresponding to the processing and procedures and can be executed by various kinds of computers.

Although the processing and procedures described in the specification are described as being executed by a single device, a single piece of software, a single component, or a single module, such processing or procedures can be executed by a plurality of devices, a plurality of pieces of software, a plurality of components, and/or a plurality of modules. Further, the software and hardware elements described in the specification can also be achieved by integrating them into fewer components or breaking them down into more components.

In the specification, when a component of the present disclosure is described as either one or a plurality of things, the component may be either one or a plurality of things, except when the context indicates otherwise.

The invention claimed is:

1. A system, comprising one or more computer processors that execute machine-readable instructions to execute:
distributing a live video provided by a distributor to viewers;
counting a first duration during which one of the viewers continuously views the live video;
determining whether the first duration has reached a first threshold that is determined based on a status value representing a status of the distributor;
in response to determining that the first duration has reached the first threshold, giving a reward to the one of the viewers during distribution of the live video;
increasing the status value in response to either an increase in a total number of times the live video is distributed by the distributor or an increase in total duration of the distribution of the live video;
before the first duration reaches the first threshold, upon determining that a second duration during which input information is not received from the one of the viewers has reached a second threshold, suspending the counting of the first duration; and
upon receiving the input information from the one of the viewers, resuming the counting of the first duration.

2. The system of claim 1, wherein the one or more computer processors further execute:
    determining whether the one of the viewers inputs the input information within a period of time after the first duration reaches the first threshold; and
    in response to determining that the one of the viewers has inputted the input information within the period, giving the reward.

3. The system of claim 1, wherein an amount of the reward given when the live video includes a moving image of the distributor is higher than an amount of the reward given when the live video does not include the moving image.

4. The system of claim 1, wherein
    an amount of the reward is higher as the status value is higher.

5. The system of claim 1, wherein
    an amount of the reward is higher as the status value is smaller.

6. The system of claim 1, wherein the one or more computer processors further execute:
    receiving the input information from the viewers during the distribution; and
    the giving of the reward includes giving the reward based on an input performance of the input information from at least one of the viewers.

7. The system of claim 6, wherein an amount of the reward given when the at least one of the viewers inputs an item is higher than an amount of the reward given when the at least one of the viewers does not input the item.

8. The system of claim 1, wherein the one or more computer processors further execute:
    during suspending the counting of the first duration, causing a display to display a screen that prompts the one of the viewers to input the input information.

9. A method executed by one or more computers, the method comprising:
    distributing a live video provided by a distributor to viewers;
    counting a first duration during which one of the viewers continuously views the live video;
    determining whether the first duration has reached a first threshold that is determined based on a status value representing a status of the distributor;
    in response to determining that the first duration has reached the first threshold, giving a reward to the one of the viewers during distribution of the live video;
    increasing the status value in response to either an increase in a total number of times the live video is distributed by the distributor or an increase in total duration of the distribution of the live video;
    before the first duration reaches the first threshold, upon determining that a second duration during which input information is not received from the one of the viewers has reached a second threshold, suspending the counting of the first duration; and
    upon receiving the input information from the one of the viewers, resuming the counting of the first duration.

10. A non-transitory computer-readable medium including a program, wherein the program causes one or more computers to execute:
    distributing a live video provided by a distributor to viewers;
    counting a first duration during which one of the viewers continuously views the live video;
    determining whether the first duration has reached a first threshold that is determined based on a status value representing a status of the distributor;
    in response to determining that the first duration has reached the first threshold, giving a reward to the one of the viewers during distribution of the live video;
    increasing the status value in response to either an increase in a total number of times the live video is distributed by the distributor or an increase in total duration of the distribution of the live video;
    before the first duration reaches the first threshold, upon determining that a second duration during which input information is not received from the one of the viewers has reached a second threshold, suspending the counting of the first duration; and
    upon receiving the input information from the one of the viewers, resuming the counting of the first duration.

* * * * *